United States Patent
Zhou

(10) Patent No.: US 7,433,516 B2
(45) Date of Patent: Oct. 7, 2008

(54) METHOD OF EXTRACTING A TEXTUAL AREA IN A DIGITAL IMAGE

(75) Inventor: Xing-Ping Zhou, Beijing (CN)

(73) Assignee: Primax Electronics Ltd., Taipei (TW)

( * ) Notice: Subject to any disclaimer, the term of this patent is extended or adjusted under 35 U.S.C. 154(b) by 605 days.

(21) Appl. No.: 11/070,781

(22) Filed: Mar. 2, 2005

(65) Prior Publication Data

US 2006/0204093 A1 Sep. 14, 2006

(51) Int. Cl.
G06K 9/34 (2006.01)
G06K 9/48 (2006.01)

(52) U.S. Cl. ............... 382/176; 382/175; 382/199; 382/190; 382/274; 382/260

(58) Field of Classification Search ............ 382/173, 382/176, 164, 171, 190, 199, 260, 274
See application file for complete search history.

(56) References Cited

U.S. PATENT DOCUMENTS 5,363,414 A * 11/1994 Muto .................... 375/340
2003/0039394 A1 * 2/2003 Yamazaki ............... 382/176
2004/0036924 A1 * 2/2004 Ihara .................... 358/3.28
2006/0034371 A1 * 2/2006 Song et al. ............ 375/240.03

* cited by examiner

Primary Examiner—Matthew C. Bella
Assistant Examiner—Ali Bayat
(74) Attorney, Agent, or Firm—Apex Juris, PLLC; Tracy M Heims

(57) ABSTRACT

A method of extracting a textual area in a digital image, in which the digital image is divided into a plurality of blocks, each being computed to obtain a number of edges, each having a higher contrast in the block at a horizontal direction and a vertical direction. Based on the determined edge number, a plurality of textual blocks are determined out of the plurality of blocks in the digital image and the corresponding textual areas may be extracted from the digital image, so that the textual area and a continuous pictorial area in the digital image may be processed separately.

4 Claims, 9 Drawing Sheets

| 190 | 185 | 145 | 99 | 89 | 116 | 170 | 187 | 198 | 207 | 208 |
|---|---|---|---|---|---|---|---|---|---|---|
| 166 | 153 | 113 | 90 | 82 | 83 | 108 | 155 | 189 | 202 | 206 |
| 95 | 92 | 85 | 79 | 77 | 79 | 84 | 120 | 181 | 202 | 204 |
| 119 | 114 | 104 | 92 | 81 | 81 | 90 | 124 | 176 | 198 | 204 |
| 180 | 181 | 163 | 117 | 91 | 90 | 124 | 169 | 191 | 196 | 203 |
| 192 | 190 | 176 | 121 | 91 | 93 | 152 | 189 | 205 | 210 | 205 |
| 199 | 195 | 175 | 123 | 90 | 94 | 161 | 196 | 208 | 208 | 204 |
| 201 | 200 | 179 | 125 | 92 | 95 | 157 | 191 | 200 | 204 | 204 |
| 204 | 202 | 187 | 135 | 95 | 96 | 160 | 194 | 203 | 207 | 207 |
| 212 | 209 | 187 | 126 | 93 | 98 | 170 | 201 | 203 | 203 | 208 |
| 208 | 203 | 180 | 126 | 94 | 98 | 163 | 203 | 205 | 206 | 209 |

FIG.3

| -5 | -40 | -46 | -10 | 27 | 54 | 17 | 11 | 9 | 1 |
|---|---|---|---|---|---|---|---|---|---|
| -13 | -40 | -23 | -8 | 1 | 25 | 47 | 34 | 13 | 4 |
| -3 | -7 | -6 | -2 | 2 | 5 | 36 | 61 | 21 | 2 |
| -5 | -10 | -12 | -11 | 0 | 9 | 34 | 52 | 22 | 6 |
| 1 | -18 | -46 | -26 | -1 | 34 | 45 | 22 | 5 | 7 |
| -2 | -14 | -55 | -30 | 2 | 59 | 37 | 16 | 5 | -5 |
| -4 | -20 | -52 | -33 | 4 | 67 | 35 | 12 | 0 | -4 |
| -1 | -21 | -54 | -33 | 3 | 62 | 34 | 9 | 4 | 0 |
| -2 | -15 | -52 | -40 | 1 | 64 | 34 | 9 | 4 | 0 |
| -3 | -22 | -61 | -33 | 5 | 72 | 31 | 2 | 0 | 5 |
| -5 | -23 | -54 | -32 | 4 | 65 | 40 | 2 | 1 | 3 |

FIG.4

| | | | | | | | | | |
|---|---|---|---|---|---|---|---|---|---|
| 0 | 0 | 0 | 0 | 1 | 0 | 0 | 0 | 0 | 1 |
| 0 | 0 | 0 | 0 | 1 | 0 | 0 | 0 | 0 | 1 |
| 0 | 0 | 0 | 0 | 0 | 0 | 0 | 0 | 0 | 1 |
| 0 | 0 | 0 | 0 | 0 | 0 | 0 | 0 | 0 | 1 |
| 0 | 0 | 0 | 0 | 1 | 0 | 0 | 0 | 0 | 1 |
| 0 | 0 | 0 | 0 | 1 | 0 | 0 | 0 | 0 | 1 |
| 0 | 0 | 0 | 0 | 1 | 0 | 0 | 0 | 0 | 1 |
| 0 | 0 | 0 | 0 | 1 | 0 | 0 | 0 | 0 | 1 |
| 0 | 0 | 0 | 0 | 1 | 0 | 0 | 0 | 0 | 1 |
| 0 | 0 | 0 | 0 | 1 | 0 | 0 | 0 | 0 | 1 |

FIG.5

|     |     |     |     |     |     |     |     |     |     |
| --- | --- | --- | --- | --- | --- | --- | --- | --- | --- |
| -5  | -40 | -46 | -10 | 27  | 54  | 17  | 11  | 9   | 1   |
| -13 | -40 | -23 | -8  | 1   | 25  | 47  | 34  | 13  | 4   |
| -3  | -7  | -6  | -2  | 2   | 5   | 36  | 61  | 21  | 2   |
| -5  | -10 | -12 | -11 | 0   | 9   | 34  | 52  | 22  | 6   |
| 1   | -18 | -46 | -26 | -1  | 34  | 45  | 22  | 5   | 7   |
| -2  | -14 | -55 | -30 | 2   | 59  | 37  | 16  | 5   | -5  |
| -4  | -20 | -52 | -33 | 4   | 67  | 35  | 12  | 0   | -4  |
| -1  | -21 | -54 | -33 | 3   | 62  | 34  | 9   | 4   | 0   |
| -2  | -15 | -52 | -40 | 1   | 64  | 34  | 9   | 4   | 0   |
| -3  | -22 | -61 | -33 | 5   | 72  | 31  | 2   | 0   | 5   |
| -5  | -23 | -54 | -32 | 4   | 65  | 40  | 2   | 1   | 3   | sum = -101 count++; sum = 27;

sum = 118 count++; for the last pixel

FIG.6

METHOD OF EXTRACTING A TEXTUAL AREA IN A DIGITAL IMAGE

BACKGROUND OF THE INVENTION

1. Field of Invention

The present invention relates to a method of processing a digital image, and particularly to a method extracting a textual area in a digital image.

2. Related Art

A content enriched digital image typically comprises figure areas, textual areas, continuous pictorial areas and the like. In processing such a digital image, different areas are generally processed in individual manners corresponding thereto. To enable all the areas in the digital image to be recognized, the figure areas and the textual areas are often endowed with clear edges, particularly for the textual areas, so that they can be discriminated for some specific uses. However, portions other than the edges of the figure and textual areas are not critically demanded since they may be presented in a not very clear result. On the other hand, images in the pictorial areas are quite demanding since they should be presented very clearly. In an application of printing the digital image using a carbon powder mode, the digital image is wholly weakened and thus the figure, textual and pictorial areas are all concurrently weakened. At this time, the presented effect of the pictorial areas is inclined to be insufficient and the edges of the figure and textual areas may lack sharpened or higher contrasts.

While being printed by use of a digital photostat, an original document is first scanned and then processed by a scanning unit in the digital photostat. After it has been processed, the original document is conversed into a grey-leveled or RGB-formatted image. Next, the image is further processed by, for example, the drivein a single bit or multi-bit manner. If the digital photostat is a color photostat, a screening step has to be executed to converse the 8-bit grey-leveled or colorful digital image to a 1-bit or multi-bit digital image. Before this screening step is performed, a color matching step is required to be conducted. Some photostats perform the above screening function through a periodic matrix while the other photostats eliminate a moir effect by using an error diffusion. Although halftones presented through executing the screening function may benefit to processing an original image having continuous tones therein, the edges of the textual areas and the figure areas becomes smoother, i.e., the edges are smoothened, thus not clear enough.

Therefore, there is a need created to provide a method of automatically discriminating a range of a textual area in a digital image so that the textual or figure area may be processed separately and endowed with clear and sharp edges while a pictorial area, having continuous tones and halftones in the digital image, may be filtered and smoothened and a smoother pictorial area may be obtained.

SUMMARY OF THE INVENTION

In view of the shortcomings encountered in the prior arts, it is an object of the present invention to provide a method of extracting a textual area in a digital image so that the extracted textual area may be separately processed.

To achieve the above object, the method of extracting a textual area in a digital image according to the present invention comprises the steps of: scanning the digital image and obtaining a lightness thereof, smoothing and filtering the digital image, dividing the digital image into a plurality of blocks, computing a number of edges, each having a higher contrast in the corresponding block in a horizontal direction and a vertical direction, and determining a plurality of textual blocks out of the plurality of blocks in the digital image.

With the method of extracting a textual area in a digital image, differences between associated pixels are relied on, which provides extraction of simple textual areas. Also, the method may reduce the cost of extracting textual areas while promoting correctness of marking the texutal areas concurrently.

The detailed description and principle of the present invention will be given in the following with reference to the attached drawings.

BRIEF DESCRIPTION OF THE DRAWINGS

The invention will become more fully understood from the detailed description given hereinbelow illustration only, and thus doesn't limit the present invention, wherein:

FIG. 3 is a schematic diagram of pixel values in a divided block in the digital image in accordance with an embodiment of the present invention;

FIG. 4 is a schematic diagram of differentiated values corresponding to the pixel values in the divided block in the digital image in accordance with the present invention;

FIG. 5 is a schematic diagram of marked positive and negative peaks corresponding to the differentiated values in the divided block in the digital image in accordance with the present invention;

FIG. 6 is a schematic illustration of a process of marking the positive and negative peaks in the divided block in the digital image in accordance with the present invention; and FIG. 7A to FIG. 7*l* are an exemplary implementation of processes of enhancing the presented effect of the textual areas in accordance with the present invention.

DETAILED DESCRIPTION OF THE INVENTION

Figure 1:
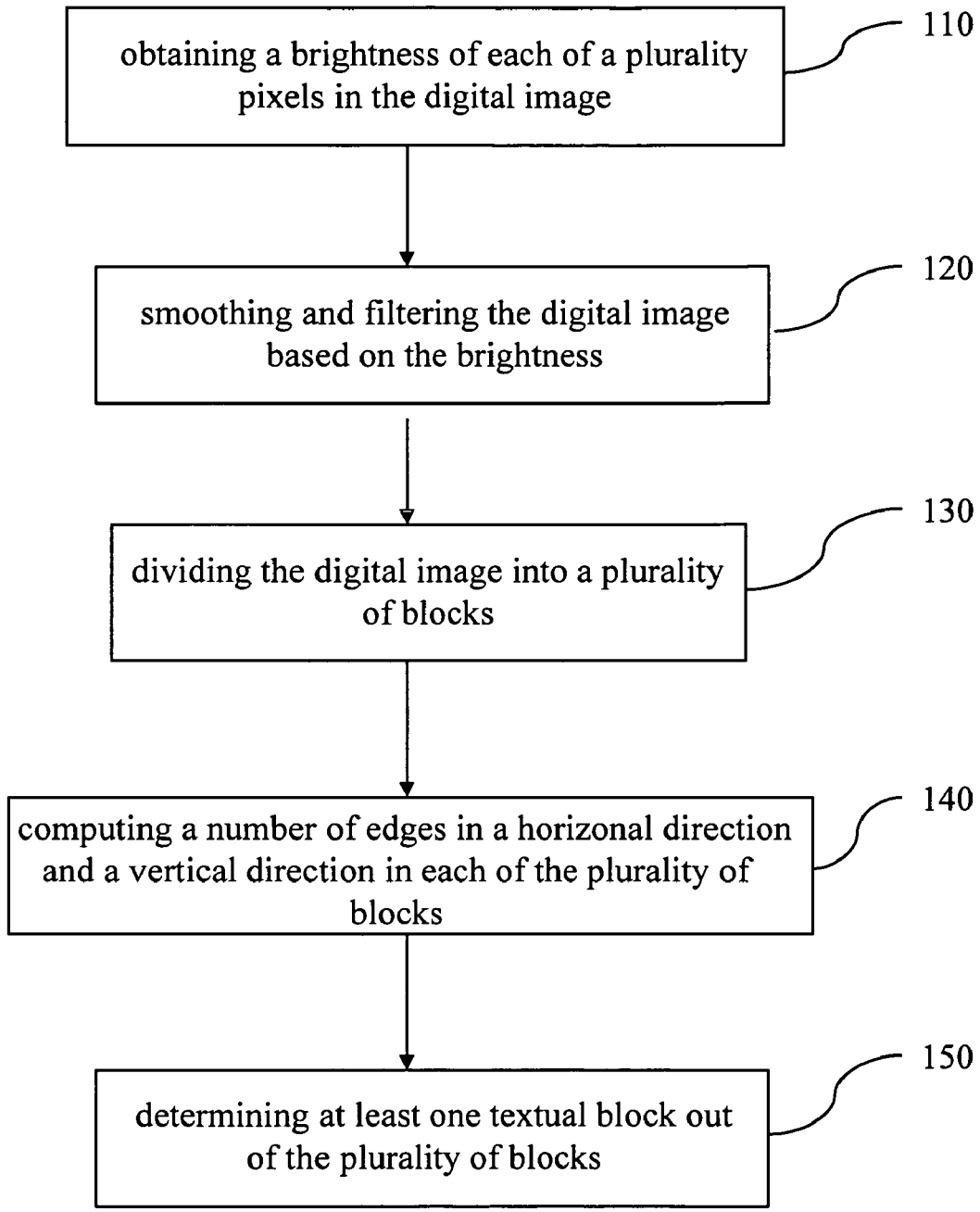
FIG. 1 is a flowchart of a method of extracting a textual area in a digital image in accordance with the present invention.

The present invention provides a method of extracting a textual area in a digital image and a flowchart of the method illustrated in FIG. 1.

Referring to FIG. 1, the method of extracting a textual area in a digital image comprises the steps of: scanning the digital image and obtaining a lightness of the digital image (step 110), smoothing and filtering the digital image (step 120), dividing the digital image into a plurality of blocks (step 130), computing a number of edges, each having a higher contrast in the plurality of blocks respectively in a horizontal direction and a vertical direction (step 140), determining a plurality of textual area out of the plurality of blocks in the digital image (step 150).

Figure 2:
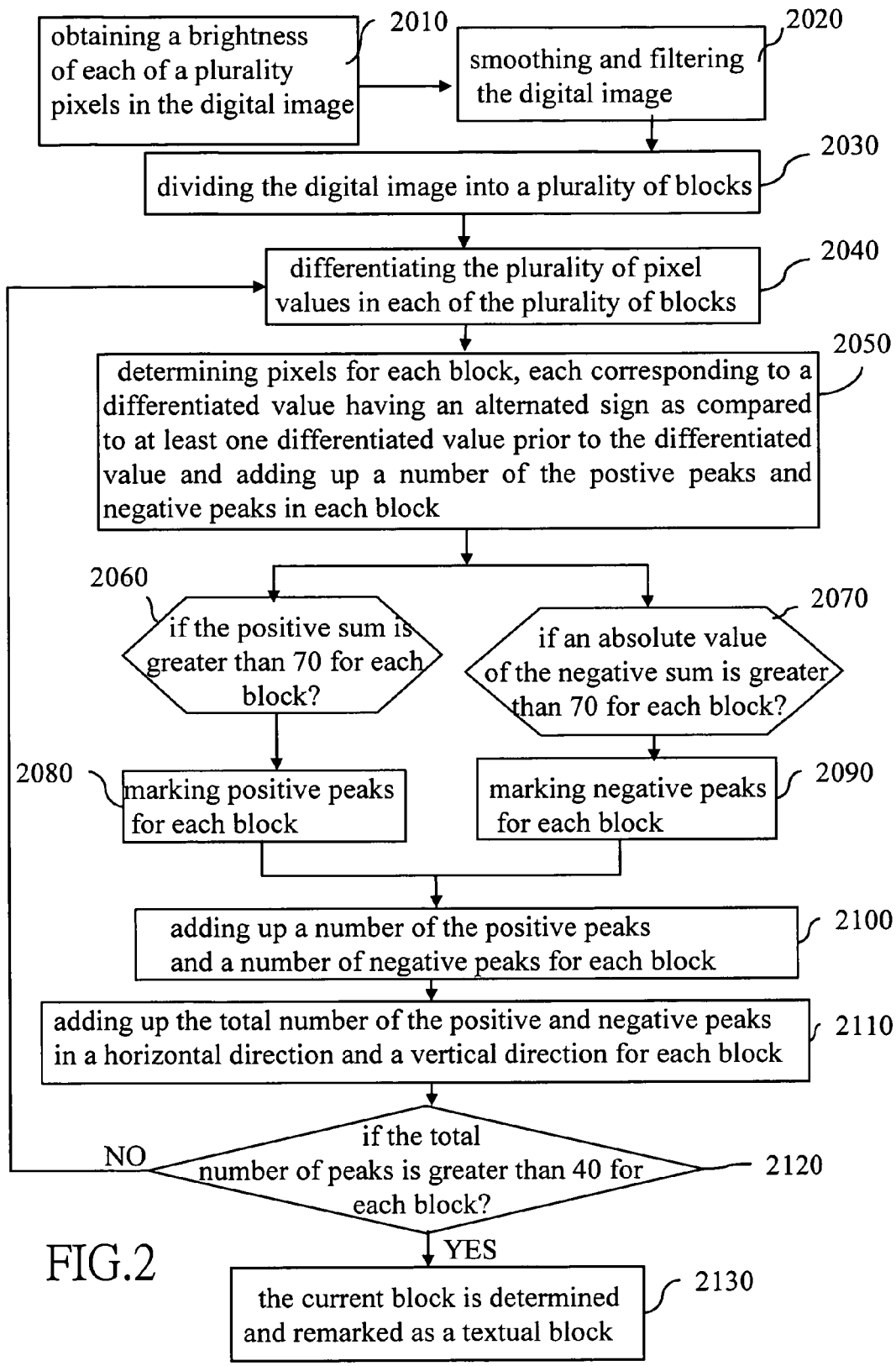
FIG. 2 is the method of extracting a textual area in a digital image in accordance with an embodiment of the present invention.
Figure 7A:
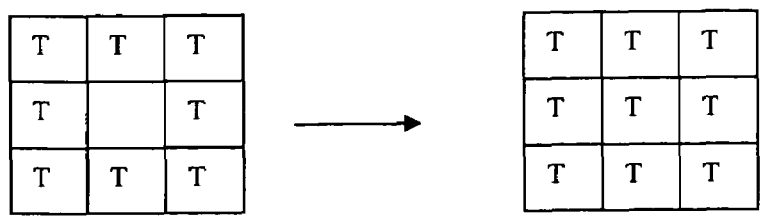
Figure 7B:
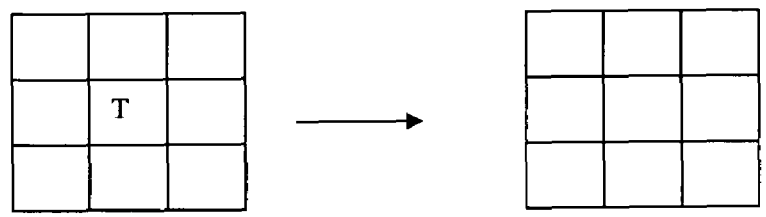
Figure 7C:
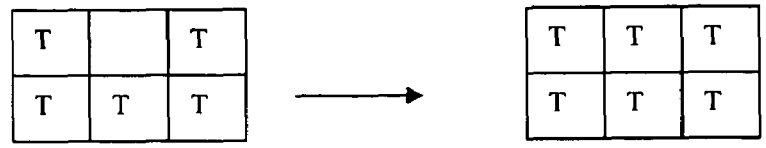
Figure 7D:
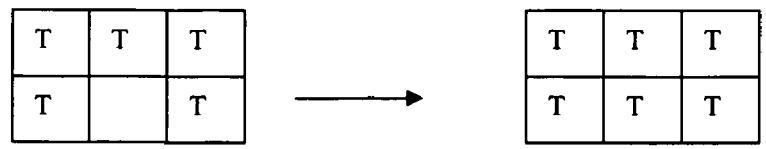
Figure 7E:
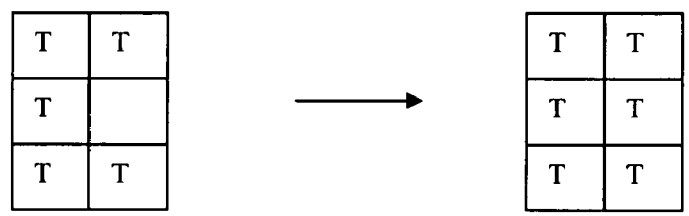
Figure 7F:
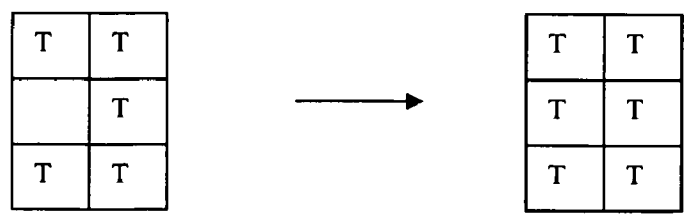
Figure 7G:
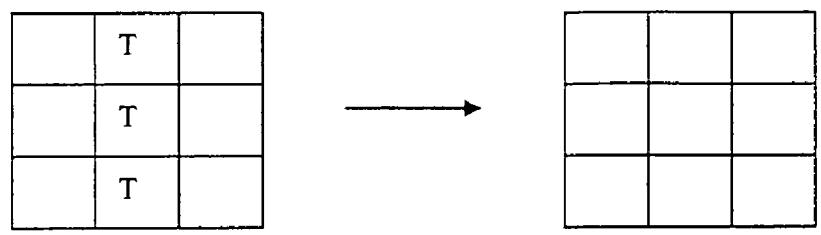
Figure 7H:
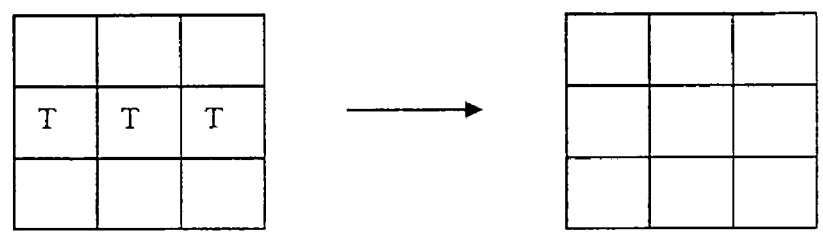
Figure 7I:
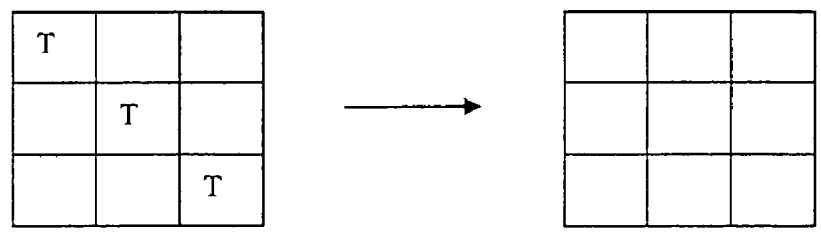

Next, an embodiment of the method of extracting a textual area in a digital image will be described and a flowchart thereof is illustrated in FIG. 2.

First, scanning the digital image and obtaining a lightness thereof (step 2010). If the digital image scanned is a single-colored image, the step of obtaining the lightness of the digital image may be omitted. Otherwise, the lightness of the colorful digital image is required to be obtained and by virtue of the lightness the colorful digital image is conversed into a grey-leveled image. If the image is in a traditional RGB format, the lightness of the image is Lightness=$R$*0.30+$G$*0.59+$B$*0.11.

In case other formats are being used, the image may be conversed into having an RGB format and then the lightness thereof may be obtained through the above formulation with respect to the lightness. Algorithms for transforming an image from the RGB color space to other color spaces, such as YcbCr and Lab color spaces, are numerous and may be computed through an associated formulation or through looking up an associated 3-D table.

Then, the digital image is subject to a pre-process. That is, each pixel in the digital image is smoothened and filtered in the pre-process (step 2020) so that adjustment errors resulting from processing over the tones in the digital image are eliminated. It is to be noted that this smoothing process may not have an effect on the original digital image. In this embodiment, the so-called Gauss filter is used as a smoothing filter as desired, to perform the smoothing function.

Next, the digital image is divided into a plurality of blocks (step 2030). Each of the divided blocks comprises N×N pixels, wherein N may be 10, 16, 32 or 64. In this embodiment, N=10 is chosen. Referring to FIG. 3, an example of a block having 10×10 pixels is shown therein.

For each block, a number of edges, each having a higher contrast in a horizontal direction and a vertical direction, is computed. Succeeding to the edge computation, a first benchmark value is used in determining if the current block is a textual block. The mentioned edge is defined as a pixel unit, which is either a positive peak pixel(grey level bigger than adjacent pixel in left side and right side when in horizontal direction or grey level bigger than adjacent pixel in up side and down side when in vertical direction), or a negative peak pixel(grey level smaller than adjacent pixel in left side and right side when in horizontal direction or grey level smaller than adjacent pixel in up side and down side when in vertical direction), if it is a positive peak pixel, its grey level difference with the adjacent negative peak pixel in left side(horizontal direction) or up side(vertical direction) must be significant, if it is a negative peak pixel, its grey level difference with the adjacent positive peak pixel in left side(horizontal direction) or up side(vertical direction) must also be significant. If the current block has a greater number of edges, the current block is determined as a textual block.

In determining or computing the number of edges for the example above, pixel values in the current block are differentiated (step 2040) and the differentiated result is shown in FIG. 4.

Then, pixels having an alternated sign in the differentiated result are determined, as shown in FIG. 4, corresponding to the current block. Next, a sum of continuous positive numbers is added up and a sum of continuous negative numbers in the differentiated result (step 2050) respectively and then it is determined if absolute values of the sums are greater than the first benchmark value (step 2060, step 2070). The preferred first benchmark value of the invention is 70.

When the sign of a current number in the block with differentiated values presented turns to a negative number from a positive number, the current number is marked as a positive peak when the sum of the continuous positive numbers prior to the current number is greater than or equal to 70 (step 2080). On the other hand, when the sign of a current number in the differentiated information turns to a positive number from a negative number, the current number is marked as a negative peak when the sum of the continuous negative numbers prior to the current number is smaller than or equal to −70 (step 2090). Namely, the sums of the continuous positive numbers and negative numbers are compared in their absolute values with 70 respectively. Then, making a marking operation according to the comparison results and the block with the marks made are shown in FIG. 5.

The real computation and comparison of the numbers in the block with differentiated values presented is shown in FIG. 6. Now here, the differentiated values shown in FIG. 5 corresponding to the illustrated block are taken continuously as an example for description of the real computation and compared with respect to the concerned differentiated values. In the first number sequences in the differentiated values [−5 −40 −46 −10 27 54 17 11 9 1], the numbers prior to the fifth number 27 of the first number sequence are all negative numbers and the numbers succeeding to the fifth number 27 are each positive numbers. Since the sum of the negative numbers prior to the number 27 is −5−40−46−10=−101 is smaller than −70, the fifth number 27 is marked with a positive peak and the number of the accumulated positive peaks at the fifth number 27 is count=count+1. As for the last number 1 in the sequence, the sum of positive numbers prior thereto 27+54+17+11+9=118>=70 is greater than 70. At this time, although the sign of the last number 1 does not turn negative, the number of the accumulated peaks at the last number 1 still has to be added by 1 as count=count+1. On the other hand, assuming the sign of the last number turns negative, the peak number also has to be added by 1 for the last number if the sum is till greater than or equal to 70. That is, the last number in a sequence should be particularly treated as described above.

Then, the sum of the numbers of the positive peaks and the negative peaks are computed (step 2100). In the vertical direction of the 10×10-pixels block, the number sequences are differentiated in a similar manner as that conducted over the horizontal number sequence in the block. The number of positive and negative peaks in the horizontal and vertical directions are computed as a total sum (step 2110). According to the total sum, if the number of the positive and negative peaks in the horizontal and vertical directions is greater, then a second benchmark value is determined (step 2120). In this embodiment, the second benchmark value is chosen as 40. If the total sum are greater or equal to 40, the current block is determined and remarked as a textual block (step 2130).

The approach described above is made for the plurality of blocks in the digital image, all the textual blocks in the digital image may be located and marked and the textual areas may also be known. With the textual areas in the digital image located, the textual blocks may be made with particular processes, such as smoothing, filling, sawtooth elimination and the like, with which the texts corresponding to the textual areas may be presented more clearly and the digital image may be enhanced with its presented effect. In enhancing the presented effect of the textual areas, an exemplary implementation may be used as is shown in FIGS. 7A-7I.

While embodiments and applications of this invention have been shown and described, it would be apparent to those skilled in the art having the benefit of this disclosure that more modifications than mentioned above are possible without departing from the inventive concepts herein. The invention, therefore, is not to be restricted except in the spirit of the appended claims and their equivalents.

What is claimed is:

1. A method of extracting a textual area in a digital image, comprising steps of:

obtaining a brightness of each of a plurality pixels in the digital image;

smoothing and filtering the digital image based on the brightness;

dividing the digital image into a plurality of blocks;
computing a number of edges in a horizontal direction and a vertical direction in each of the plurality of blocks; and
determining at least one textual block out of the plurality of blocks,
wherein the step of computing the number of edges in a horizontal direction and a vertical direction in each of the plurality of blocks comprises the steps of:
differentiating the plurality of pixel values of each of the plurality of blocks;
marking a positive peak and a negative peak for the plurality of pixel values of each of the plurality of blocks according to the differentiated values corresponding to the plurality of pixel values;
adding up number of the positive peak and negative peak as a positive peak sum and a negative peak sum respectively; and
determining the number of the edges in each of the plurality of blocks according to the positive peak sum and the negative peak sum.

2. The method as recited in claim 1, wherein the step of marking positive peaks and negative peaks further comprises the steps of determining pixels each having a sign-alternated pixel value as compared to a preceding pixel value of the plurality of pixels in each of the plurality of blocks according to the differentiated values obtained in the differentiating step;
adding up positive pixel values and negative pixel values in the plurality of blocks as a positive sum and a negative sum respectively according to the differentiated values;
comparing the positive sum and an absolute value of the negative sum respectively with a first benchmark value; and
marking the positive peak and the negative peak according to the comparison result.

3. The method as recited in claim 2, wherein
the first benchmark value is 70.

4. The method as recited in claim 2, wherein
marking the positive peaks and the negative peaks further comprises the steps of:
marking the positive peak if the positive sum is greater than the first benchmark value; and
marking the negative peak if an absolute value of the negative sum is greater than the first benchmark value.

* * * * *